United States Patent
Leal et al.

(10) Patent No.: US 11,978,113 B1
(45) Date of Patent: *May 7, 2024

(54) CROSS-DEVICE PRESENTATION WITH CONVERSATIONAL USER INTERFACE

(71) Applicant: United Services Automobile Association (USAA), San Antonio, TX (US)

(72) Inventors: Philip Andrew Leal, San Antonio, TX (US); Ricardo Alcantar, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/326,677

(22) Filed: May 31, 2023

Related U.S. Application Data

(63) Continuation of application No. 16/258,268, filed on Jan. 25, 2019, now Pat. No. 11,776,046.

(Continued)

(51) Int. Cl.
*G06Q 30/0601* (2023.01)
*G06F 16/9038* (2019.01)
*G10L 15/26* (2006.01)

(52) U.S. Cl.
CPC ..... *G06Q 30/0643* (2013.01); *G06F 16/9038* (2019.01); *G06Q 30/0623* (2013.01); *G10L 15/26* (2013.01)

(58) Field of Classification Search
None
See application file for complete search history.

(56) References Cited

U.S. PATENT DOCUMENTS

| 8,650,031 B1 | 2/2014 | Mamou et al. |
| 9,229,623 B1 | 1/2016 | Penilla et al. |

(Continued)

OTHER PUBLICATIONS

Li, L. (2014). Next generation of recommender systems: Algorithms and applications (Order No. 3644780). Available from ProQuest Dissertations and Theses Professional. (1637726683). (Year: 2014).

(Continued)

*Primary Examiner* — Thu N Nguyen
(74) *Attorney, Agent, or Firm* — Fish & Richardson P.C.

(57) ABSTRACT

Techniques are described for cross-device presentation. During a speech interaction with a conversational user interface (CUI) executing on an input device, such as a personal assistant (PA) device or other computing device, a user may utter one or more search terms to search for an item, such as a vehicle to purchase. The search term(s) may be employed by a search engine to identify one or more items that correspond to the search term(s). The search engine can generate recommendation information that includes a description of the item(s) corresponding to the search term(s). The recommendation information can be communicated to an output device that is registered to, or otherwise associated with, the user who spoke the search term(s) to the input device. In some instances, the recommendation information can be presented through speech output on the PA device or other device.

20 Claims, 12 Drawing Sheets

Related U.S. Application Data

(60) Provisional application No. 62/621,704, filed on Jan. 25, 2018.

(56) References Cited

U.S. PATENT DOCUMENTS

| | | | |
|---|---|---|---|
| 9,576,573 B2* | 2/2017 | Bodell | G10L 15/22 |
| 10,127,596 B1 | 11/2018 | Franke | |
| 10,366,442 B1 | 7/2019 | Oczkowski | |
| 11,776,046 B1 | 10/2023 | Leal et al. | |
| 2008/0147399 A1 | 6/2008 | Jaiswal et al. | |
| 2009/0150152 A1* | 6/2009 | Wasserblat | G10L 15/26 |
| | | | 704/254 |
| 2009/0254454 A1 | 10/2009 | Gupta | |
| 2010/0312724 A1 | 12/2010 | Pinckney et al. | |
| 2012/0159543 A1 | 6/2012 | Jin et al. | |
| 2012/0278127 A1 | 11/2012 | Kirakosyan | |
| 2013/0325627 A1 | 12/2013 | Kimmerling | |
| 2014/0181204 A1 | 6/2014 | Sharp | |
| 2014/0188665 A1 | 7/2014 | Baker et al. | |
| 2014/0229847 A1 | 8/2014 | Park | |
| 2014/0279263 A1 | 9/2014 | Liu | |
| 2014/0317031 A1 | 10/2014 | Babenko | |
| 2015/0095085 A1 | 4/2015 | Sweeney et al. | |
| 2015/0149484 A1 | 5/2015 | Kelley | |
| 2015/0244805 A1 | 8/2015 | Hampholi et al. | |
| 2016/0086250 A1 | 3/2016 | Gunjan | |
| 2016/0350834 A1 | 12/2016 | Wilson | |
| 2016/0364783 A1 | 12/2016 | Rannanuja | |
| 2017/0060518 A1 | 3/2017 | Hong et al. | |
| 2017/0193586 A1 | 7/2017 | Yuan et al. | |
| 2017/0193587 A1 | 7/2017 | Caster et al. | |
| 2018/0075845 A1 | 3/2018 | Kochura et al. | |
| 2018/0364898 A1* | 12/2018 | Chen | G06F 3/0483 |

OTHER PUBLICATIONS

Ghahrannani, "Probabilistic machine learning and artificial intelligence," Nature, 2015,521:452-9.

\* cited by examiner

Item profile 124(1)
```
   name   Comfort  Holds_value  Affordable   Quality  Reputation  \
   AB12  0.521107     0.497368   -0.762925  0.504554    0.799825

Reliable      Safe  Fuel_efficient  Spacious      Urban  Commuting  \
 0.547962  0.267289       -0.619493  0.768382  -1.111526    -0.2295

Towing  Carpooling  Practical    Sporty  Family_friendly    Unique  \
  1.294004    0.440083  -0.321047 -0.461812        -0.278325  0.501809

Luxury
 0.53706
```

Item profile 124(2)
```
   name   Comfort  Holds_value  Affordable   Quality  Reputation  \
   BC23  1.403107     0.821988    -1.12335  1.855798    1.015468

Reliable      Safe  Fuel_efficient  Spacious      Urban  Commuting  \
-0.451409  1.142881       -0.674411  0.153189  -0.108811   0.180133

Towing  Carpooling  Practical    Sporty  Family_friendly    Unique  \
 -0.718901    0.909641  -2.459317  1.049598         -0.43214   1.74494

Luxury
 2.044014
```

Item profile 124(3)
```
   name   Comfort  Holds_value  Affordable   Quality  \
   CD34  0.220189    -1.05391    0.262851 -0.684107

Reputation  Reliable      Safe  Fuel_efficient  Spacious      Urban  \
  -1.42003 -1.860283 -0.999464       -1.196135  0.738136  -0.617027

Commuting    Towing  Carpooling  Practical    Sporty  Family_friendly  \
-2.159862 -0.236819    1.568185   1.290879 -1.131424         1.195526

Unique    Luxury
 -1.643858 -0.874267
```

Criterion 502
Criterion score 504

*FIG. 5*

CROSS-DEVICE PRESENTATION WITH CONVERSATIONAL USER INTERFACE

CROSS REFERENCE TO RELATED APPLICATIONS

The present disclosure is a continuation of U.S. patent application Ser. No. 16/258,268, titled "Cross-Device Presentation With Conversational User Interface," which was filed on Jan. 25, 2019, which claims benefit of U.S. Provisional Patent Application No. 62/621,704, titled "Cross-Device Presentation With Conversational User Interface," which was filed on Jan. 25, 2018, the entire contents of which are incorporated by reference into the present disclosure.

BACKGROUND

Various types of network-connected smart appliances, Internet of Things (IoT) devices, mobile devices, and/or other computing devices have become available to consumers. Such devices may serve a primary function (e.g., a washing machine washing clothes), while also providing smart capabilities for sensing its state, and/or the state of the local environment, collecting state data, executing logic, communicating information to other devices over networks, and so forth. Different devices may have different capabilities with regard to data input and data output. For example, a device may accept audio input (e.g., speech input) and provide audio output, but may not include a display for visually presenting data, or may include a limited display that does not support a graphical user interface (GUI). As another example, a device such as a television may include a large display but may lack a full-featured user interface for inputting data.

SUMMARY

Implementations of the present disclosure are generally directed to cross-device presentation. More specifically, implementations are directed to receiving one or more search terms through a conversational user interface of an input device, generating recommendation information based on the search term(s), and presenting the recommendation information through at least one output device other than the input device.

In general, innovative aspects of the subject matter described in this specification can be embodied in methods that include operations of: receiving speech data provided by a user during a speech interaction with a conversational user interface (CUI) executing on an input computing device; analyzing the speech data to determine at least one search term that is specified by the user through the speech interaction; determining an item score for each of a plurality of items, wherein the item score indicates a predicted affinity of the user for a respective item and is determined based at least partly on a degree of correspondence between the at least one search term and criteria information for the respective item; generating recommendation information for the user describing at least one recommended item for which the respective item score is at least a threshold value; and transmitting the recommendation information for presentation through at least one output computing device that is associated with the user.

Implementations can optionally include one or more of the following features: the operations further include transmitting the recommendation information to the input computing device for presentation through the CUI; the input computing device is a personal assistant (PA) device; the input computing device is headless; the at least one output computing device includes a display; the recommendation information is transmitted to the at least one output computing device for presentation through the display; the analyzed speech data is audio data that is recorded by at least one microphone that is a component of the input computing device; the analyzed speech data is text data that is generated by transcribing at least a portion of audio data that is recorded by at least one microphone that is a component of the input computing device; the plurality of items includes a plurality of vehicles available for purchase; the recommendation information includes a plurality of recommended items that are ordered according to the respective item score for each of the plurality of recommended items.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide the following technical advantages and technical improvements over previously available solutions. By integrating services through a conversational user interface executing on a personal assistant device, implementations provide an efficient, hands-free, speech interactive technique for accessing services that avoids or reduces the use of graphical user interfaces executing on other computing devices, thus reducing the amount of processing power, active memory, network bandwidth, storage capacity, and/or other computing resources that may be employed by previously available systems to provide services to users. Moreover, by integrating services through a conversational user interface executing on a personal assistant device, implementations provide a technique to leverage a personal assistant device that a user may have in their home or other environment, to provide new options to access services, facilitate item searches, facilitate transactions, provide marketing opportunities to a service provider, enable a service provider to reduce costs and time spent for customer service personnel, and generally provide a more positive and easy-to-use user experience than is available using traditional, previously available search interfaces.

Moreover, by providing a search interface that presents item recommendations determined based on one or more of a criteria-based algorithm, a content-based algorithm, or a collaborative algorithm, implementations provide an advantage over traditional item search systems that are limited to traditional term-based searches. Moreover, by enabling users to search for items based on natural language and/or plain language criteria, implementations provide recommendations that may correspond to emotions, moods, lifestyle aspirations, or other aspects that may not be accurately captured by technical search terms supported by other item search systems. By using the various recommendation determination algorithms described herein, alone or in combination, implementations may provide recommendations that are more useful to users and that are more attuned to the users' personalities than those provided by traditional item search systems. Implementations may also provide useful recommendations more quickly than a traditional search system which may require multiple search attempts to reach a useful set of recommendations. Accordingly, implementations provide a technical advantage over traditional search systems which may require a greater number of less accurate searches before reaching a useful set of recommendations, if at all. In particular, systems the operate according to the implementations described herein thus may consume less processing power, less memory, less network bandwidth, and less storage space than traditional search systems which take longer to provide results that are helpful for users.

It is appreciated that aspects and features in accordance with the present disclosure can include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF DRAWINGS

FIG. 5 depicts an example of item profiles that may be employed to determine item recommendations for a user, according to implementations of the present disclosure.

DETAILED DESCRIPTION

Implementations of the present disclosure are directed to systems, devices, methods, and computer-readable media for cross-device presentation. During a speech interaction with a conversational user interface (CUI) executing on an input device, such as a personal assistant (PA) device, a user may utter one or more search terms to search for an item, such as a vehicle to purchase. The search term(s) may be employed by a search engine to identify one or more items that correspond to the search term(s). The search engine can generate recommendation information that includes a description of the item(s) corresponding to the search term(s). The recommendation information can be communicated to an output device that is registered to, or otherwise associated with, the user who spoke the search term(s) to the input device.

In some instances, the user may follow up with additional refinements to the initial query that includes the search term(s), to reduce the number of search results or redirect the search in a somewhat different direction. The search engine may receive the refined and/or different search terms, and/or the user-spoken constraints on the item(s) shown in the recommendation information, and modify the displayed recommendation information accordingly. In this way, the user and the CUI may engage in a speech interaction (e.g., a conversation) in which the user requests recommendation information based on one or more terms, and the CUI responds appropriately if the search engine is able to provide the requested information. A search session may include any number of interactions between the user and the CUI, with output presented on the output device(s). In some instances, the input device is a PA device or other type of computing device that executes a CUI. A PA device may be a stand-alone computing device with components to receive speech input, provide speech output, process information, retrieve stored information, and/or communicate with other computing device(s) over one or more wired and/or wireless networks. For example, the PA device may be an Amazon Echo™. In some instances, the PA device does not include a display, or includes a display with limited capabilities.

Figure 1:
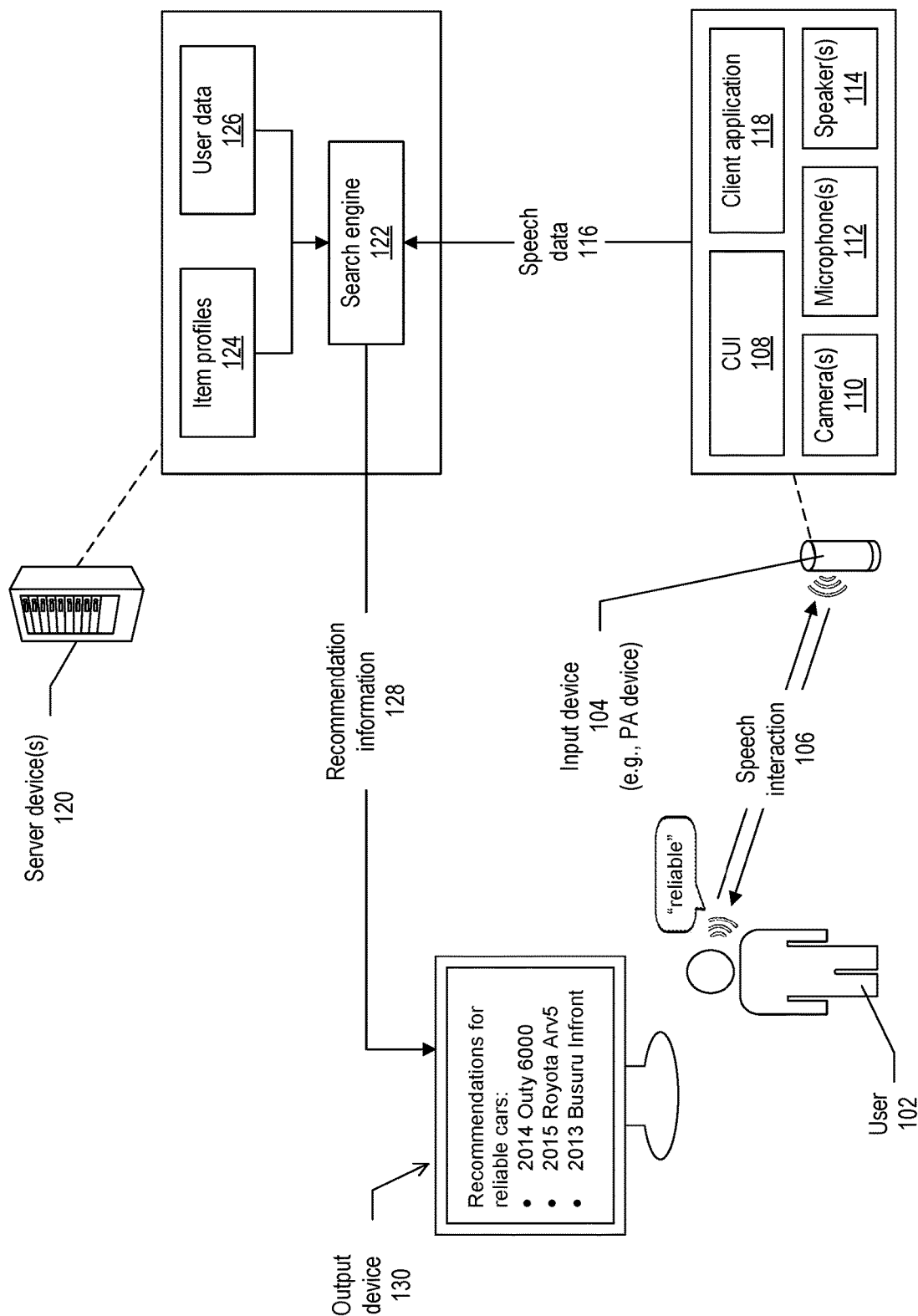
FIG. 1 depicts an example system for cross-device presentation of recommendation information using a conversational user interface, according to implementations of the present disclosure.

FIG. 1 depicts an example system, according to implementations of the present disclosure. As shown in the example of FIG. 1, a user 102 may interact with an input device 104 in an environment. The environment may be a building such as a house or a room within a building. The environment may also be at least partly outdoors. The input device 104 may be any suitable type of computing device that executes a CUI 108. In some instances, the input device 104 is a PA device, which can be any suitable type of personal assistant and/or artificial intelligence (AI) powered device, such as the Amazon Echo™. The PA device may be a headless device that lacks a display for visual output, or that includes a limited display that is not able to present a rich GUI such as that of a smartphone, tablet computer, or other type of computing device.

In some instances, the input device 104 may be configured to execute a CUI 108 that receives speech data input from a user 102 and responds with speech data output to the user. The speech data that is received from the user 102 and output from the input device 104 may be described as a speech interaction 106 (conversation) between the user 102 and the input device 104. The speech interaction 106 may include any appropriate number of speech inputs from the user 102 to the input device 104, and/or any appropriate number of speech outputs from the input device 104 to the user 102. The speech interaction 106 may also be described as a session or a conversation between the user 102 and the input device 104. A CUI 108 may be designed to mimic or simulate a conversation with a real human, such that a user 102 can interact with the CUI 108, and with the input device 104, at least partly through a voice conversation.

The input device 104 can include one or more cameras 110 that capture still image(s) and/or video data of area(s) in proximity to the input device 104, such as video data and/or still image(s) of the user 102 while the user is (or is not) engaged in the speech interaction 106 with the input device 104. The data generated by the camera(s) 110 can include video and/or still image(s) in any suitable size and format, such as a version of the MPEG-4 or MP4 format.

The input device 104 can also include one or more microphones 112 for receiving and recording audio data, such as the speech input received from the user 102 during the speech interaction 106. The input device 104 can also include one or more speakers 114 for providing output audio data, such as the speech data generated and played by the input device 104 during the speech interaction 106 with the user 102. The audio data can be processed using any suitable audio data format. The input device 104 can support any appropriate natural language for receiving audio input and providing audio output.

In some instances, the input device 104 can include other capabilities for data input and/or data output. Data input capabilities may include a display of any suitable type, such as a liquid crystal display (LCD) or light-emitting diode (LED) display, that is suitable for presenting an interface such as graphical user interface (GUI), command-line interface, or other type of interface, and receiving user input through the interface. Data input capabilities may include audio input component(s) such as the one or more microphones 112 configured to receive audio (e.g., speech) input from a user 102, and software components to analyze and/or transcribe the audio input, such as speech-to-text (STT) module(s), semantic analysis module(s), voice recognition module(s), and so forth. Data input capabilities may also include haptic input component(s) that detect vibrations, rotations, impacts, and/or other movements of the input device 104, such as movements caused by a user. Data input capabilities may also include any suitable number of hard controls on the input device 104, such as hardware implemented buttons, knobs, slider controls, switches, toggles, keyboards, joysticks, mouse controllers, touchpads, touchscreens, and so forth. Implementations also support other appropriate types of data input capabilities.

Data output capabilities of the input device 104 may include a display of any suitable type, such as a LCD or LED display, which is suitable for presenting a GUI, other types of graphics, images, video content, text data, and so forth. Data output capabilities may include audio output component(s) such as the speaker(s) 114. Data output capabilities may include haptic output component(s) such as haptic actuator(s) configured to vibrate and/or otherwise move at least a portion of the input device 104 in response to signal(s). Data output capabilities may include any suitable number and/or type of hardware implemented outputs such as LEDs on a client device. Implementations also support other appropriate types of data output capabilities.

A client application 118 executing on the input device 104 may interact with the CUI 108 to receive the speech data uttered by the user 102 to the CUI 108, and may communicate the speech data 116 to a search engine 122 executing on one or more server devices 120. In instances where the speech data 116 communicated to the search engine 122 is a transcript, or at least a partial transcript of the utterances of the user 102, the client application 118 may transcribe the speech input to generate text data that is communicated, as the speech data 116, to the search engine 122.

The server device(s) 120 may include any appropriate number and/or type of computing device. In some implementations, the speech data 116 communicated from the input device 104 to the search engine 122 includes audio data of the recorded speech of the user 102. In such implementations, the server device(s) 120 can execute a transcription engine that generates at least a partial transcript of the audio data using any suitable speech-to-text (STT) technique(s). In some implementations, the input device 104 generates at least a partial transcript of the speech of the user 102, and the speech data 116 that is sent to the search engine 122 includes the partial transcript as text data that includes any appropriate number of words, phrases, sentences, and so forth.

The server device(s) 120 may execute the search engine 122 that performs a search for items, based on one or more search terms included in the speech data 116. As described further below, the search terms may be "lifestyle" or "personality"-based terms that describe interests of the user, the user's hobbies, aspects of the user's lifestyle, intended uses for the item (e.g., vehicle) to be purchased, and so forth. For example, the user may utter search terms such as "reliable," "full-efficient," and "outdoors," to indicate that the user 102 is interested in vehicles that are reliable and full-efficient, and that are suitable for use in outdoor activities such as camping, surfing, hiking, and so forth. The search engine 122 may perform a search based on the search terms, and generate recommendation information 128 that describes one or more items that correspond to the search term(s) uttered by the user 102. The recommendation information 128 can be transmitted to one or more output devices 130. The output device(s) 130 may include device(s) that are registered to the user 102 and/or otherwise associated with the user 102. For example, to facilitate viewing the recommendation information 128 that is generated based on search term(s) uttered to a headless input device 104, such as a PA device, the system may transmit the recommendation information 128 to an output device 130 that includes a display, such as the user's television, and instruct the output device 130 to present the recommendation information 130. In this way, implementations employ output device(s) 130 that may be more suitable for presenting the recommendation information 128, instead of presenting the information through the input device 104 which may have limited output capabilities. In some instances, the recommendation information 128 may be sent to the input device 104 for presentation thereon, in addition to be presented through the output device(s) 130.

In some instances, the user 102 may be authenticated by an authentication engine executing on the server device(s) 120. Authentication may be based on credentials received from the user 102, such as a password, passphrase, personal identification number (PIN), knowledge-based question (e.g., "what is your favorite pet's name?"), and/or other information that the user 102 has previously provided for use in authenticating the user 102. In some instances, authentication may be based on a credential that is communicated to another registered device of the user 102, and then provided by the user 102 through the input device 104. For example, the server device(s) 120 may send a PIN to the user's registered smartphone, in a text message or through some other communication channel, and the user 102 may verify their identity by speaking the PIN to the input device 104. If the spoken PIN matches the PIN sent to the smartphone, the user 102 is successfully authenticated. Other authentication mode(s) may also be used to authenticate the user 102, including biometric authentication based on collected biometric data such as the user's heart rate, fingerprint, retinal scan, and so forth. Authentication can also be performed using image(s) and/or video data collected through the camera(s) 110, to recognize at least a portion of the user's face, body, posture, walking gait, and so forth. The audio data collected from the user may also be used to authenticate the user 102 through voiceprint recognition.

Based on a successful authentication of the user 102, the search engine 122 may accept the speech data 116 including the search term(s), perform the search based on the search term(s), and communicate the recommendation information 128, including one or more recommended items that correspond to the search term(s), to the output device(s) 130 and/or input device 104 of the user 102. In some implementations, the recommendation information 128 is provided to the user 102 in response to a successful authentication of the user 102. If the user 102 cannot be authenticated, the recommendation information 128 may not be communicated for presentation through the output device(s) 130 and/or input device 104.

In some implementations, the speech interaction 106 may begin with the user 102 uttering a particular word or phrase to launch the client application 118 (e.g., skill) on the input device 104. For example, the user 102 may utter the phrase "vehicle search" to launch the application. The application may respond by instructing the CUI 108 to request search term(s) from the user 102. The user 102 may utter their search term(s) and request that the search be initiated based on the uttered term(s). The search process may then be initiated and performed as described herein.

In some implementations, the server device(s) 120 store session information that describes one or more sessions involving speech interactions between the user 102 and the input device 104. The session information for a session may include an indication whether the user 102 has been authenticated during the particular session, and/or information regarding the search terms, search results, search refinements, and/or general subjects of the conversation during the session. In some instances, an authentication of the user 102 may have a time-to-live (TTL), such that a user may be re-authenticated if sufficient time has passed since the last authentication of the user (passive or otherwise). A session may be deemed as complete if a certain period of time passes with no speech interaction between the user and the PA device. In some implementations, the session information may be stored on the server device(s) 120 and/or externally on storage device(s) that are accessible by the server device(s) 120 over one or more networks.

In some implementations, the server device(s) 120 may provide various service(s) to user(s) 102. The service(s) may include financial service(s) associated with banking, investment management, lending, home financing, vehicle purchase financing, and so forth. In some instances, the service(s) may include insurance service(s) for health insurance, vehicle insurance, life insurance, homeowner's insurance, and so forth. Implementations also support other types of service(s).

The search engine 122 may perform the search based on item profiles 124 that are stored on the server device(s) 120 or elsewhere. In some implementations, the search may be further based on context information regarding the user 102, such as the user's location, demographic information, previous purchases, current vehicle, expressed interests or hobbies, and so forth. Such information can be stored in user data 126 and accessed by the search engine 122 to perform the search 122. The item profiles 124 and user data 126 are described further below.

Figure 2:
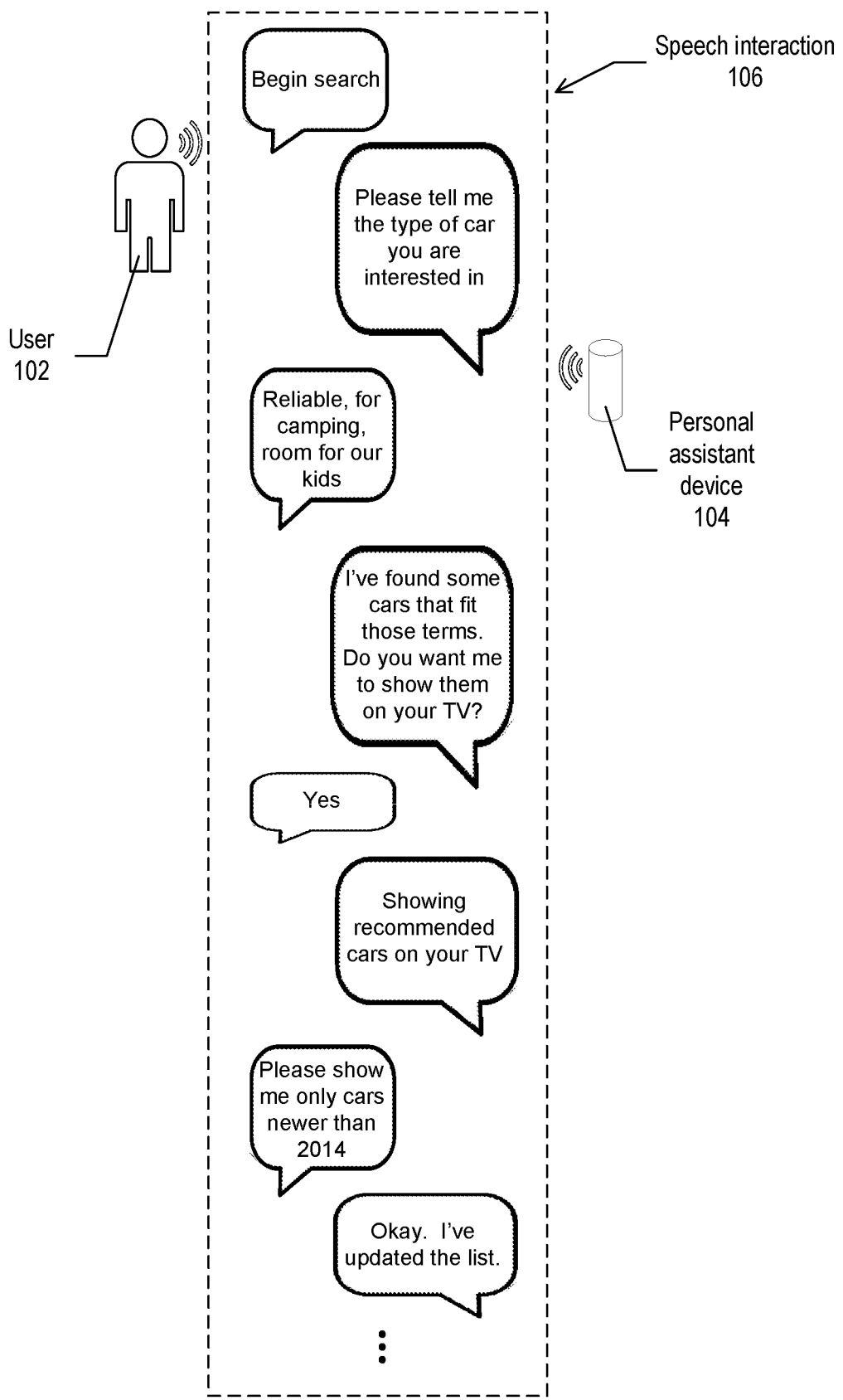
FIG. 2 depicts an example speech interaction between a user and a personal assistant device, according to implementations of the present disclosure.

FIG. 2 depicts an example of a speech interaction 106 between a user 102 and an input device 104, according to implementations of the present disclosure. In these examples, the user 102 initiates the speech interaction 106 (e.g., conversation) by uttering a particular triggering phrase "begin search." The input device 104 responds to the triggering phrase by asking the user 102 to utter search term(s) (e.g., "what type of car are you interested in?"). In the example of FIG. 2, the user 102 utters terms (e.g., words or phrases) describing lifestyle characteristics, vehicle attributes, and/or ideas for use of the vehicle. A search may be performed based on such term(s), instead of or in addition to searching based on traditional vehicle search criteria (e.g., make, model, year, transmission type, body type, color, etc.). The recommendation information 128, including item(s) identified during the search as corresponding to the search term(s), may be generated and sent to an output device 130 for presentation thereon. In this example, the system has detected that the user's television is active, and the system asks the user 102, through the CUI 108, whether the recommendation information 128 is to be presented on the television. Based on the user's affirmative reply, the system may transmit the recommendation information 128 to the television for display thereon. In some instances, as in this example, the user 102 may provide follow-up information to alter and/or refine the search, and thus alter the search results shown in the recommendation information 128. For example, the user 102 can utter "show cars newer than 2014," and the system may filter or otherwise alter the item(s) in the recommendation information 128 and present the altered information to the user 102. The session may continue through any number of search requests and/or refinements, in this manner.

Figure 3:
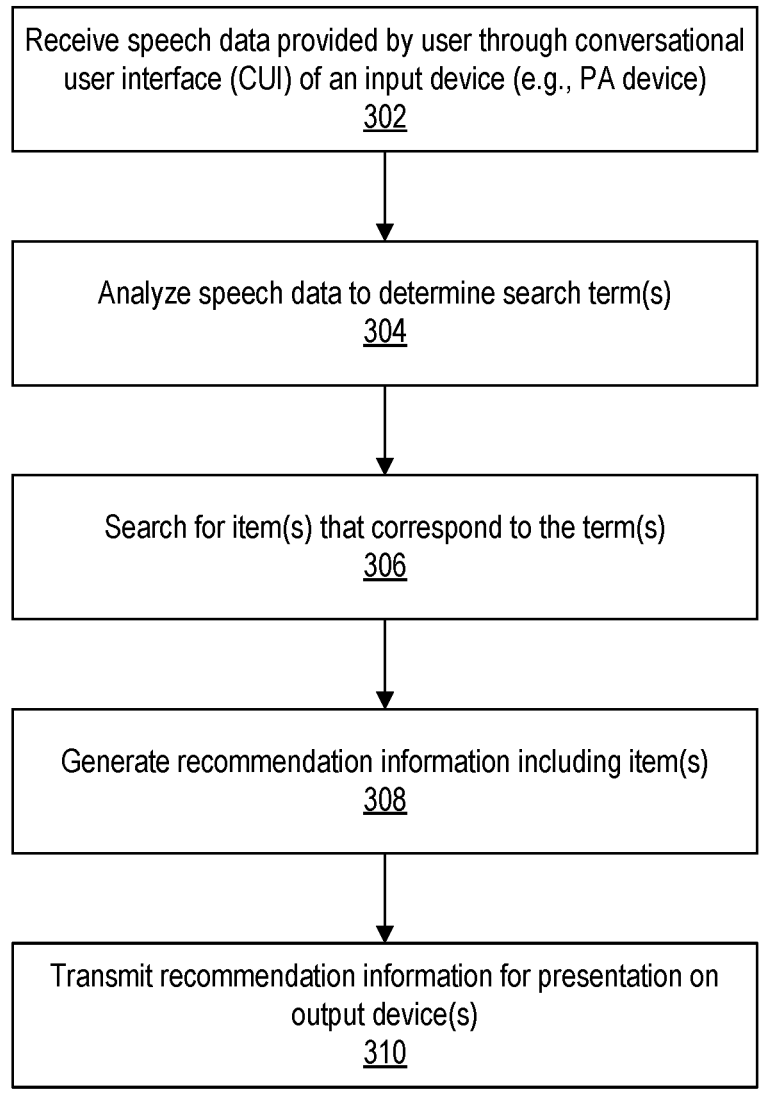
FIG. 3 depicts a flow diagram of an example process for cross-device presentation of recommendation information using a conversational user interface, according to implementations of the present disclosure.

FIG. 3 depicts a flow diagram of an example process for performing a search based on uttered search terms, according to implementations of the present disclosure. Operations of the process may be performed by one or more of the CUI 108, the client application 118, the search engine 122, and/or other software module(s) executing on the input device 104, the server device(s) 120, or elsewhere.

The speech data 116 is received (302). As described above, the speech data may be collected through the CUI 108 of the input device 104 during a conversation between the user 102 and the CUI 108. The speech data 116 may be transcribed recorded audio data of the user's speech, and/or the (e.g., raw) recorded audio data of the user's speech. The speech data 116 is analyzed (304) to determine the search term(s) uttered by the user 102. A search is performed (306) to identify one or more items, if any, that correspond to the search term(s). Recommendation information 128 is generated (308), including a description of the item(s) corresponding to the search term(s). The recommendation information 128 is transmitted (310) to the output device(s) 130 and/or input device 104 for presentation thereon.

In some implementations, the system provides for a vehicle search (or other type of item search) that is performed based on terms uttered by the user 102, such as lifestyle terms, general attributes of vehicles, interests of the user 102, and so forth. Such uttered terms can include indications that the user 102 is interested in vehicles that are comfortable, reliable, fuel-efficient, suitable for transporting children, suitable for hiking trips, suitable for use in a ridesharing service, and so forth. A search based on such terms can be performed, and search results can be presented as the recommendation information 128 on one or more suitable output devices 130. For example, instead of or in addition to speech output results presented through the input device 104, the results can be presented through output device(s) 130 that are present in the user's environment (e.g., home), registered to the user 102, and/or otherwise associated with the user 102, such as the user's television, smartphone, tablet, desktop computer, and so forth. The output device(s) 130 can be listening for commands from the server device(s) 120 (e.g., listening on a network socket), and results can be presented on a single output device 130 or mirrored across multiple output device(s) 130 with similar or different data output capabilities. In some implementations, the particular output device(s) 130 used may be based at least partly on feedback from the user 102. For example, the user 102 may specify (e.g., through the input device 104), "show results on my living room TV." The service executing on the server device(s) 120 may identify the particular user 102 that is speaking to the CUI 108, based on prior authentication or user(s) that are registered user(s) of the input device 104, and the service may also access registered device information indicating which other device(s) are associated with the speaking user 102. The service may select an appropriate output device 130 for presenting the recommendation information 128, based on which device(s) are associated with the speaking user 102 and/or currently active (e.g., turned on and network-accessible).

In some implementations, multiple listening processes on the server device(s) can perform various tasks based on the user's recorded utterances, and one of those listeners may be the search engine 122 that performs the search based on the uttered search terms. The search engine 122 can output the recommendation information 128 based on the capabilities of the available output devices 130. For example, the recommendation information 128 can be formatted or otherwise arranged for output on a large display, if a television is available for output. The output may be presented on a single output device 130 or multiple output devices 130 as appropriate. In some implementations, multiple users 102 may be in different locations with access to different output devices 130, and the recommendation information 128 may be presented on the different output devices 130 to the different users.

Various output devices 130 can registered themselves with the service and/or the user 102 can register the device(s). During such registration, device capability information can be collected indicating the input and/or output capabilities of each registered device. In some instances, the user 102 may indicate which output device(s) 130 are to be used to present the recommendation information 128, and/or the user 102 may specify preference information (e.g., stored with the user data) indicating preferred output device(s) 130 for vehicle search results or other types of output.

In some implementations, the search engine 122 may be part of a platform that analyzes data regarding users and purchasable items (e.g., products and/or services), and provides user experiences to users regarding the buying, leasing, and/or selling of item(s), the history (e.g., journey) of item(s), and/or other services associated with the item(s) (e.g., insurance, banking, investments, etc.). In some implementations, data may be analyzed by the platform to provide output to power multiple user experiences (e.g., user interfaces). Such user experiences may include providing a user with recommendation(s) of items (e.g., vehicles) that may be purchased by the user. In some implementations, the search engine receives and analyzes a variety of input data regarding user(s) and purchasable item(s). Based on the analysis, the search engine may provide recommendations regarding items (e.g., products and/or services) that a user may purchase or otherwise acquire. The recommendation(s) may be presented to the user through a search user interface (UI).

In some implementations, the recommendation(s) for a user may be determined through a criteria-based algorithm. The search engine 122 may enable the user to search for items based on various criteria. In some implementations, the criteria may include natural language and/or plain language search terms. In some examples, the natural language and/or plain language terms may exclude technical jargon, brand names, model numbers, model years, and/or numeric specifications of technical attributes (e.g., numbers for horsepower, torque, gas mileage, etc.). For example, the search engine may enable a user to search for an automobile to purchase, and the user may enter criteria (e.g., fun, sporty, economical, beach, hiking, etc.) that describe the automobile, the user's desired experience with the automobile, and/or the user's desired lifestyle generally. The search engine may compare those criteria to item profiles 124 previously generated for one or more vehicles, and determine a set of recommended vehicles that correspond to the criteria (e.g., search terms) entered by the user. Plain language and/or natural language search criteria may express an emotion, a mood, a lifestyle, and/or other aspects that may not be readily quantifiable through the traditional technical specifications employed by traditional search systems.

The search engine may also employ other algorithms to generate recommendations for the user. In some implementations, the search engine may determine a set of content-based recommendations through a machine learning process that classifies a user's affinities (e.g., likes, dislikes, etc.) for item(s) according to automobile specifications provided by manufacturers of the vehicles. In some implementations, the search engine may determine a set of collaborative recommendations by correlating a first user with a second user based on at least a partial correspondence between the affinities of the two users, and identifying those items that were liked (or disliked) by the second user as positive (or negative) recommendations for the first user. In some implementations, the various algorithms may be employed in combination to determine a set of item recommendations for the user. In some examples, the criteria-based algorithm may be employed to initialize (e.g., seed) a set of recommendations for a user, which may then be refined through use of the content-based and/or collaborative algorithm(s).

The platform may also output information that provides the basis for other user experiences in addition to, or instead of, the search output through the recommendation information 128. For example, the platform may provide information presented through an item history UI that describes the history (e.g., journey) of an item such as an automobile, including repair and maintenance history, trips taken, locations visited, distance traveled, fuel consumption, operating conditions, and so forth. In some implementations, the platform may provide information presented through a sale UI that assists the user in selling an item (e.g., a vehicle) to another user. The search engine may also provide information to support (e.g., power) other UI(s) related to product or service offerings, customer support, and so forth. Accordingly, the platform may enable a user experience (e.g., a comprehensive user experience) to be provided to a user with regard to various owned or operated items (e.g., vehicles, homes, appliances, etc.) as well as the user's services (e.g., insurance, financial services, etc.). The various UI(s) may provide different lenses and/or views into the data that is collected and analyzed by the search engine. The platform may provide different insights to users regarding their use and/or ownership of items such as vehicles.

Although examples herein may describe the items as vehicles, implementations are not so limited. In some implementations, the search engine may be employed to analyze data and provide output data for user experiences associated with other types of items, such as homes (e.g., houses, apartments, condominiums, etc.), appliances, computer hardware and/or software products, travel destinations, and so forth.

The search engine 108 may analyze the user uttered search terms and perform the search based on the term(s). The search may also be based on other information such as survey data, item data (e.g., item profiles 124), user data 126, and/or graph data. The various types of data may be stored (e.g., locally) on the server device(s) 120. The data may also be stored externally to the server device(s) 120, on storage device(s) that are accessible to the server device(s) 120 over one or more networks.

The survey data may include the results of surveys taken by various users, in which the users associate particular criteria with particular items (e.g., vehicles). For example, a survey may ask a user whether they think a particular make and/or model of vehicle is sporty, practical, expensive, fancy, economical, good for families, good for hiking, good for kayaking, and so forth. Surveys may employ text, images, video, audio, and/or other types of content to determination associations between criteria and items.

The survey data may be analyzed by the platform to generate item profile(s) 124 for one or more items. The item profile(s) 124 may include a record (e.g., profile) for each of one or more items (e.g., vehicles). Each profile may include a list of criteria and a score that indicates, for each criterion, a degree of association between the item and the criterion. The item profile(s) 124 may be determined based on the survey data. For example, if a large number of surveys indicate that users tend to associate vehicle brand X with the criterion "sporty", the item profile 124 for vehicle brand X may include a high score for the criterion "sporty." The survey data and the item profile(s) 124 may be employed in the criteria-based analysis to determine recommendation information 128 based on search term(s).

In some instances, at least a portion of the item data may be provided by original equipment manufacturers (OEMs) such as the manufacturer of the vehicle, builder of a house, and so forth. The item data may describe the technical specifications of the item, recommended operating conditions and/or parameters, dimensions, components, and so forth. For example, the OEM-provided item data for a vehicle may indicate one or more of engine size, engine type (e.g., piston, rotary, etc.), horsepower, torque, body type (e.g., coupe, sedan, truck, hatchback, etc.), fuel (e.g., gasoline, diesel, electric, hybrid, etc.), wheel size, length, width, height, number of doors, transmission type (e.g., manual, automatic, etc.), number of transmission gears, steering type (e.g., power, manual, etc.), headlamp configuration, suspension, four-wheel or two-wheel drive, color, price, and so forth. Item data may also include total cost of ownership (TCO) information for a vehicle or other items.

The user data 126 may include any appropriate type of information regarding the user 102. For example, the user data 126 may include the user's location, demographic characteristics (e.g., age, gender, etc.), interests, purchase history, web browsing history, professional and/or social affiliations, and/or social network activities (e.g., posts). The user data 126 may also include identification information such as the user's name, login, profile name, user name, and so forth. The user data 126 may indicate items currently owned by, leased by, and/or otherwise associated with the user 102, such as the user's vehicle(s). The user data 126 may further include one or more of the following: user profile information; transactional data (e.g., banking, insurance, investment transactions, etc.); interaction data describing the user's interactions with a web site, mobile app, desktop application, operating system, and/or other software; historical information regarding the previous items (e.g., vehicles) owned, bought, and/or sold by the user; value information regarding the user's current or historical items; aggregation data that aggregates information from multiple sources such as financial accounts, email, travel reward accounts, etc.; life event data, such as the user getting married, divorced, having children, graduating college, starting or leaving a job, etc.; actuarial data regarding the user 102; advice-related content and/or points of view regarding the user 102; financial readiness information (e.g., financial readiness score) or other financial status data; financial plan, budget, or goals; social media data; data describing interactions between users or interactions between the user 102 and the platform, including search sessions; data describing interactions between users and customer service personnel and/or systems; sensor data describing the user's locations, movements, and so forth.

The graph data may include a graphical representation of nodes connected by edges, e.g., as a directed graph. Users, items, and criteria may each be presented by a node, and an edge connecting two nodes may represent an association between the two nodes. The graph data may be generated by the platform as a representation of the user data, the search term(s), the item data, the survey data, and/or the item profile(s). The graph data may be employed by a content-based algorithm, as described below. The graph data may also be employed by a collaborative algorithm, as described below.

The platform may also employ other information to perform the various operations described herein. In some examples, the platform may access third party data describing the usage of vehicles or other items. Such data may include vehicle value information, depreciation information, TCO data, and so forth. The platform may also access third party data describing users 102, such as social network data.

Based on the analysis of the user input search term(s) and/or other data, the search engine 108 may generate the recommendation information 128 to be presented to the user 102. In some implementations, the recommendation information 128 may include one or more recommendations for item(s) that may be purchased or otherwise acquired by the user 102. The recommendation(s) may be determined particularly for the user 102, based on the search term(s) and/or other data. The user 102 may interact with the search engine 122, through the CUI 108, to provide further information, and the recommendation(s) (and/or other output) may be modified based on the further information.

Implementations support the use of various recommendation determination algorithms to generate recommendation(s) to be presented to a user 102. Such algorithms may include one or more of: a criteria-based algorithm, a content-based algorithm, and a collaborative algorithm. In some implementations, the individual sets of recommendation(s) generated by the various algorithms may be combined and/or merged to determine an overall set of recommendation(s).

Some implementations employ a classifier, which may also be described as a model, to determine recommendations to provide to a user 102. The classifier may be trained, refined, and/or otherwise developed using a learning algorithm that executes as part of the search engine or separately from the search engine. Determination and use of the classifier is described further below. In some implementations, the learning algorithm may refine the classifier based on information describing actual outcomes of the search process. For example, the search engine may determine recommendations for the user, and information may be collected regarding which vehicle the user decides to purchase. The learning algorithm may compare the recommendations to the actual purchase, and refine the classifier, based on the comparison, to provide more accurate recommendations in the future to the same user and/or other users.

In some implementations, the classifier may provide a model that is developed based on behavioral data, demographic data, and/or psychometric data for users. Behavioral data includes a description of particular behaviors of the user and/or other users who behave similarly to the user. Behavior can include particular activities that user(s) perform using their vehicles, such as work-related activities, recreational activities, family-related activities, and so forth. Demographic data includes a description of the users themselves, such as their location, age, gender, profession, educational achievement, marital status, parental status, and so forth. Psychometric data includes a description of how users answer particular questions posed to them as part of the vehicle search process. Users who exhibit similarity in how they answer such questions may be determined to be psychometrically similar. The classifier (or model) described herein may be based on one or more of behavioral data, demographic data, and/or psychometric data.

In some implementations, other types of models may be employed in conjunction with the classifier to determine vehicle recommendations for a user 102. For example, an income-based model may be developed for a user 102 based on known (or inferred) information regarding the user's income, debts, assets, and so forth. The income-based model may include a budget that is suitable for a particular user 102, such as an overall budget for a vehicle purchase and/or monthly budget covering the cost of owning and/or operating the vehicle. In instances where financial information may not be available for a particular user, an income-based model may be developed for that user based on identified similarities between the user and another user for whom financial information is available. In some implementations, a model may be determined for a user that predicts whether the user is likely to prefer a new vehicle or a used vehicle, and/or whether the user is likely to prefer a vehicle purchase or a vehicle lease.

Figure 4:
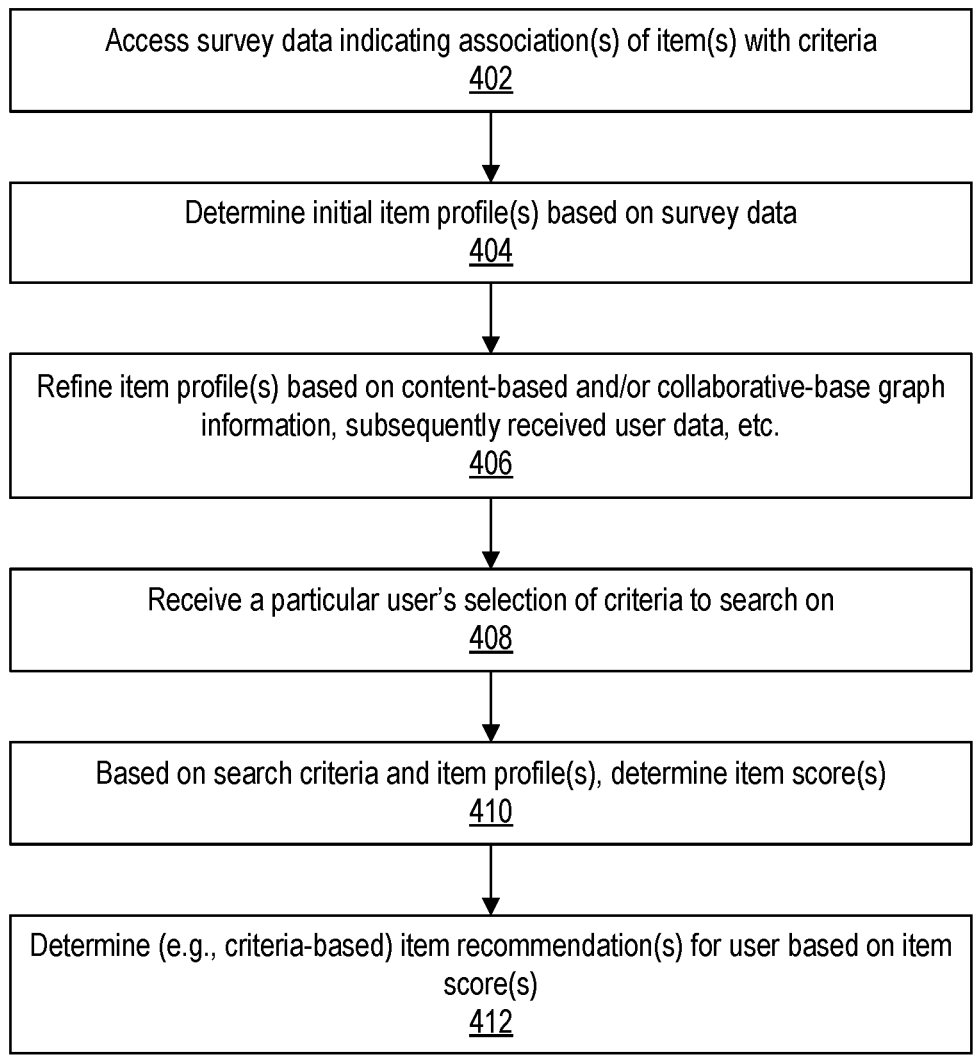
FIG. 4 depicts a flow diagram of an example process for determining item recommendations for a user, according to implementations of the present disclosure.

FIG. 4 depicts a flow diagram of an example process for determining (e.g., criteria-based) item recommendations for a user 102, according to implementations of the present disclosure. Operations of the process may be performed by one or more of the search engine 122, and/or other software module(s) executing on the server device(s) 120 or elsewhere.

The survey data may be accessed (402). As described above, the survey data may indicate, for one or more items, an association of the item with one or more criteria. The association may be a positive association, e.g., item A is criterion X. The association may be a negative association, e.g., item B is not criterion Y. The association may also indicate a degree of association between an item and a criterion, e.g., item C is 75% criterion Z.

An initial set of item profile(s) may be determined (404) based on the survey data. FIG. 5 depicts an example of item profiles. As shown in this example, an item profile may include the name of an item (e.g., "AB12"). The item profile may also include a list of criteria 502 and a criterion score 504 associated with each of the criteria 502. In some examples, a positive score may indicate a degree of positive association of an item with a criterion, e.g., an item is a criterion. A negative score may indicate a degree of negative association of an item with a criterion, e.g., an item is not a criterion. The "\" characters in the example item profiles of FIG. 5 indicate a line continuation, e.g., the record of criterion/score pairs for an item continues to a next line.

In some instances, a criteria score 504 for a criterion 502 of an item may be an average of the scores assigned by multiple users in multiple surveys. For example, a survey may ask 10000 users whether the item "AB12" is sporty. If 7524 of the users indicate that they think "AB12" is sporty, the item profile for "AB12" may include a criterion score of 0.7524 for the "sporty" criterion. In instances when the survey asks users to rank whether "AB12" is sporty on a scale, e.g., from −10 (maximally non-sporty) to 10 (maximally sporty), the criterion score may be an average of the various numeric rankings in the survey results for "AB12" and "sporty."

Implementations support the use of any appropriate number of criteria, and any appropriate criteria, for an item profile. For example, in instances where the item(s) are vehicles (e.g., cars, trucks, motorcycles, recreational vehicles, mopeds, boats, aircraft, etc.), the criteria may include, but are not limited to: comfort, holds value, affordable, quality, reputation, reliable, safe, fuel efficient, spacious, urban, commuting, towing, carpooling, practical, sporty, family friendly, unique, luxury, and so forth. Although examples herein may describe the various criteria as adjectives (e.g., unique) or descriptive words and/or phrases (e.g., family friendly), implementations are not so limited. In some implementations, users may be asked in a survey to indicate a song, book, movie, genre, and/or idea that describes an item, and the criteria 302 may include the various songs, books, movies, genre, and/or ideas that were indicated by users in the survey results. In this way, implementations may provide an emotional profile and/or personality profile of an item such as a vehicle. For example, one vehicle may be characterized as "rock and roll" whereas another vehicle may be characterized as "jazz" or "avant garde." As another example, one vehicle may be characterized as a "western film" whereas another may be characterized as "science fiction film."

Returning to FIG. 4, in some implementations the initial item profile(s) may be refined (406) over time based on the content-based and/or collaborative analysis described below. The item profile(s) may also be refined based on subsequently received user input from one or more users, additional survey data, or other information. In this way, the item profile(s) may be refined over time to provide a more accurate description of an item such as a vehicle.

A particular user 102 may provide, through the search UI 112, a selection of various criteria 302 to search on. The user's selected criteria may be received (408) in the form of the uttered search term(s). For example, the user 102 may utter search criteria such as "sporty" and "fun" or "practical" and "family friendly" to indicate the type of vehicle the user 102 wants, the type of driving experience the user 102 is seeking, and/or the type of life experience the user 102 is seeking. In this way, implementations enable a user 102 to provide aspirational criteria that describe a lifestyle the user is seeking, in addition to or instead of indicating criteria that describe the user's current situation. In some implementations, the selected criteria may be filtered prior to subsequent processing. Such filtering may be based on one or more rules, and may remove selected criteria that the rules indicate are mutually incompatible. For example, if a user selects criteria that include both "sports car" and "towing," one or both of the criteria may be filtered out, given that there may not be vehicles that are both a sports car and are suitable for towing. In some implementations, the user 102 may be prompted to resolve such a conflict if an incompatibility is determined within a set of selected criteria.

The user's selected criteria (e.g., search term(s)) and the item profile(s) may be used to determine (410) one or more item scores for the user 102. An item score may indicate a degree of correlation between the user's entered criteria and the item profile of a particular item. In some implementations, the item score for an item may be an average of the individual criteria scores 304 corresponding to the search criteria entered by the user 102. For example, a user 102 may specify the following criteria through the search UI 112: "comfort," "affordable," "safe," and "family friendly." Based on these criteria and the item profile 124(1) shown in FIG. 5, the search engine may determine an item score of −0.2489 for item "AB12". Based on the item profile 124(2), an item score of 0.992 may be determined for item "BC23". Based on the item profile 124(3), an item score of 0.685 may be determined for item "CD34". In this example, each entered search criteria is weighted the same in determine the item score. In some implementations, criteria may be weighted differently such that the determination of the item score may include calculating a weighted average of the criterion scores for the search criteria.

The criteria-based recommendations for a user 102 may be determined (412) based on the item scores. In some examples, the recommendations may be provided as a ranked list that is ordered according to the item scores. Following the example above, the recommendation(s) may include (e.g., in ranked order): "BC23" with score 0.992, "CD34" with score 0.685, and "AB12" with score −0.2489. In some implementations, items with a negative score may be omitted from the recommendation(s), given that such items have been determined to be negatively associated with the user's search criteria. The recommendation(s) may be transmitted for presentation to the user 102 through the output device(s) 130.

Figure 6:
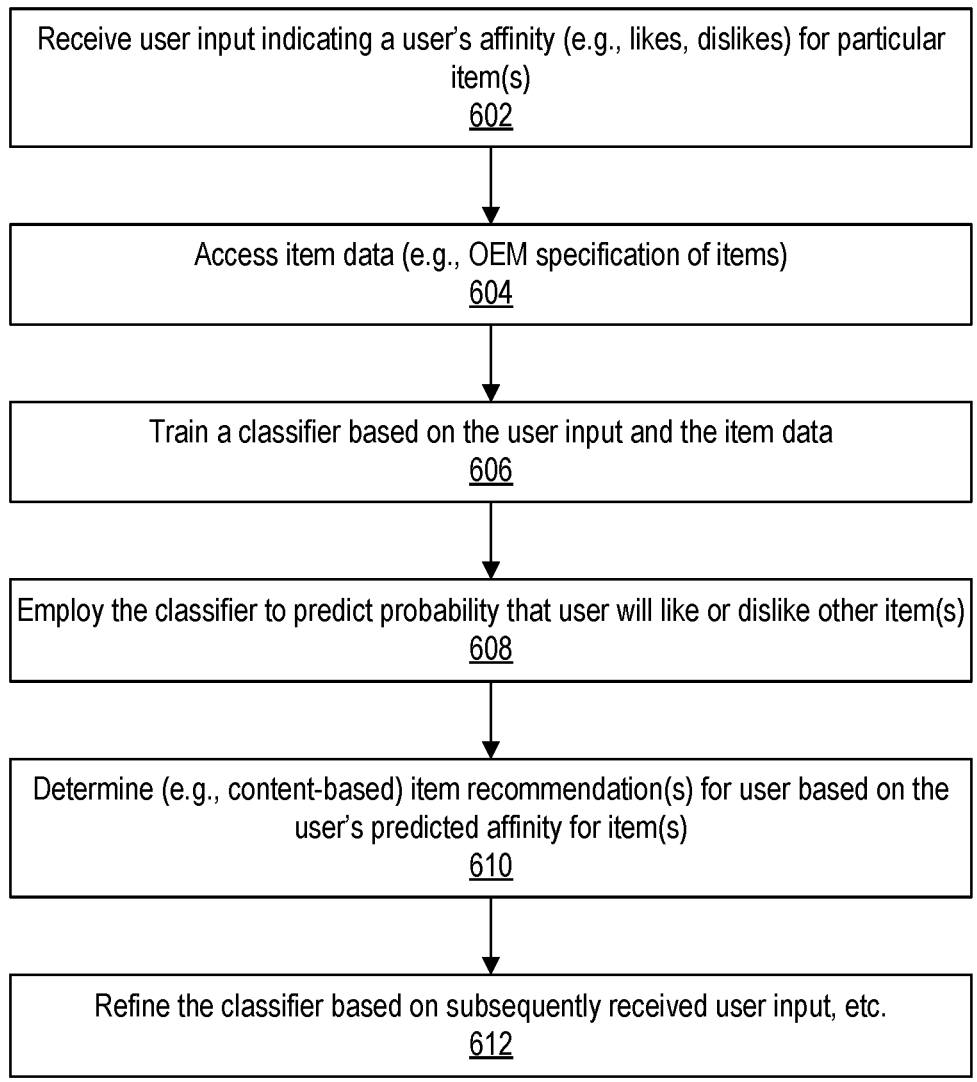
FIG. 6 depicts a flow diagram of an example process for determining item recommendations for a user, according to implementations of the present disclosure.

FIG. 6 depicts a flow diagram of an example process for determining (e.g., content-based) item recommendations for a user 102, according to implementations of the present disclosure. Operations of the process may be performed by one or more of the search engine 122, or other software module(s) executing on the server device(s) 120 or elsewhere.

User input is received (602), such as the search term(s) entered through the CUI. The user input may indicate the user's affinity for particular item(s) or types of item(s) such as vehicles. In some implementations, the user 102 may indicate their affinity for an item as a binary like or dislike, e.g., a spoken indication of whether the user likes or dislikes particular items in the recommendation information 128. In some implementations, the user 102 may indicate their affinity in a more granular manner, such as rating an item on a scale from 0 to 10, where 10 indicates that the user 102 has a maximum positive affinity for the item and 0 indicates that the user 102 has a minimum positive affinity (or a maximum negative affinity) for the item. As used here, affinity can indicate any degree to which the user 102 likes and/or dislikes an item.

Item data is accessed (604). As described above, the item data 120 may indicate a set of technical specifications for each of one or more items. In some instances, the item data may be provided by OEM(s) of the item(s).

A classifier may be trained (606) based on training data that includes the item data and the user input that indicates the user's various affinities for items. In some implementations, the classifier may be trained through machine learning. The classifier may identify correlations between the user's likes, or dislikes, and the particular technical specifications of items. For example, the classifier may examine multiple vehicles liked and/or disliked by the user 102 and determine that the user 102 tends to like vehicles that have a manual transmission and dislike vehicles that have an automatic transmission. As another example, the classifier may determine that the user 102 tends to like vehicles with high (e.g., above a threshold) horsepower and dislike vehicles with low (e.g., below a threshold) horsepower. Accordingly, the classifier may include logic that determines for a particular item (e.g., vehicle) a likelihood that a particular user 102 will like or dislike that item. The output of the classifier may be a binary prediction of like or dislike. In some implementations, the output of the classifier is a numeric prediction of affinity on a scale from minimum affinity (e.g., maximum dislike) to maximum affinity (e.g., maximum like). For example, the classifier may output a value between 0 and 1, where 0 indicates zero likelihood that the user 102 will like an item and 1 indicates 100% likelihood that the user 102 will like the item.

The classifier may be employed (608) to predict an affinity of the user 102 for one or more item(s) and/or determine a probability that the user 102 may like, or dislike, one or more items. Based on the predicted affinities, a set of (e.g., content-based) item recommendations 130 may be determined (610) for the user 102. The recommendations may be provided for presentation to the user 102 through the output device(s) 130. In some implementations, the recommendations may be a list that is ranked and/or ordered based on the predicted likelihood that the user 102 will like the items.

In some implementations, the classifier may be refined (612) or otherwise modified through further training based on subsequently received information. For example, the user 102 may be presented with a set of recommendations determined through one or more of the algorithms described herein, and the user 102 may provide further user input indicating their affinity (e.g., likes and/or dislikes) for the recommended item(s). This additional affinity information may be employed as training data to refine the classifier. The classifier may be refined any number of times over any time period based on additional information received regarding the user's affinities.

In some implementations, the content-based algorithm may examine and cluster multiple users according to similarities in location, purchase history, content browsing history, demographics, and/or other characteristics. Clustering may also be based on similarities between life experiences of the users in the cluster. For example, users may be clustered together if they are going through, or are about to go through, a similar life event such as starting a job, retiring from a job, starting a family, sending children to college, and so forth.

Based on the user's expressed likes and/or dislikes of items, the classifier may be trained to predict whether the user 102 will like or dislike item(s) that the user 102 has not yet seen and expressed an opinion on. Accordingly, the classifier may determine whether an item may be a "good fit" for the user 102 based on its technical specifications. In some implementations, the classifier may traverse a decision tree or other type of graph to determine the likelihood that a user 102 will like, or dislike, an item. In some implementations, the classifier may be trained based on technical specifications of the item(s) as described above. The classifier may also be trained based on other features of the item(s), such as whether the OEM is in a particular country.

Figure 7:
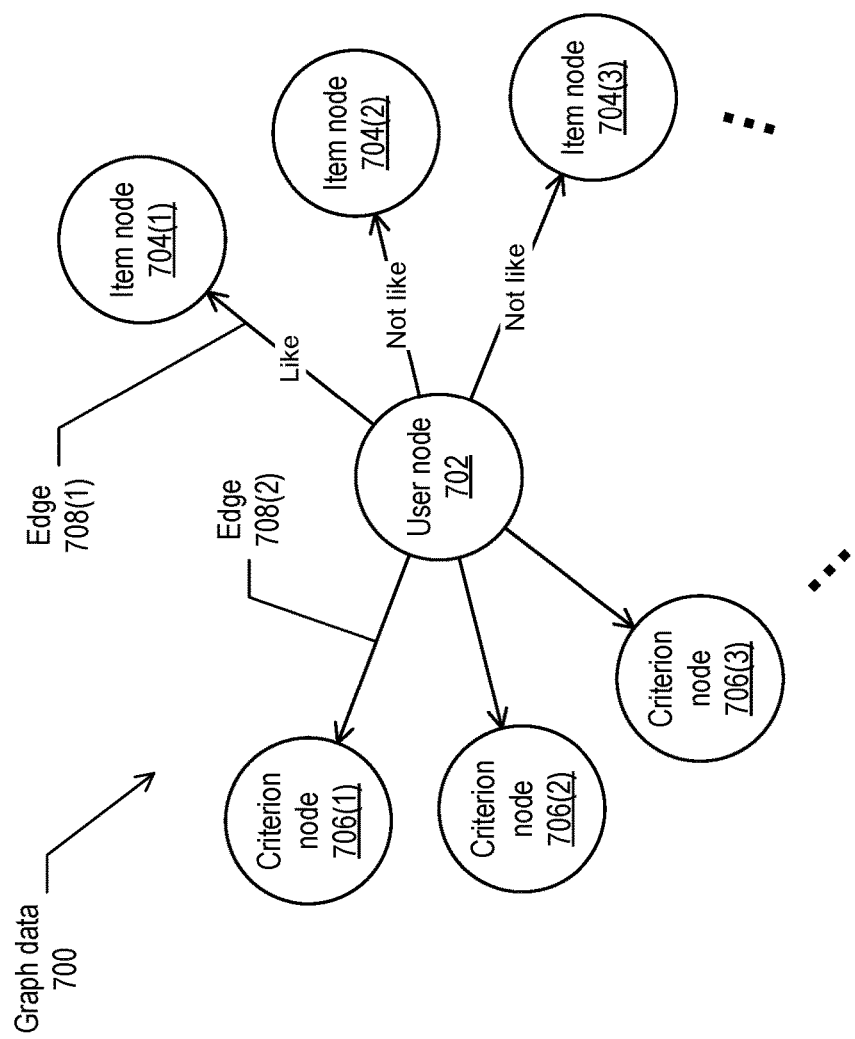
FIG. 7 depicts an example of graph data that may be employed to determine item recommendations for a user, according to implementations of the present disclosure.

FIG. 7 depicts an example of graph data 700 that may be employed to determine (e.g., content-based) item recommendations for a user 102, according to implementations of the present disclosure. In some implementations, the information describing a user's affinities, e.g., likes and/or dislikes, for items may be arranged and analyzed in a graph form, as graph data 700. The analysis of a graph may include traversal of the graph along particular path(s) that are governed by the values of edges 708 in the graph.

In some implementations, the graph data may include a user node 702 corresponding to the user 102. The graph data may include one or more item nodes 704 each corresponding to an item. Edges 708(1) may connect the user node 702 to the various item nodes 704. In some implementations, an edge 708(1) between the user node 702 and a particular item node 704 may include a value that indicates the user's expressed affinity for the item corresponding to the item node 704. For example, if the user 102 has liked or disliked an item, the edge 708(1) may include a value of "like" or "not like" respectively. In some implementations, the value of an edge 708(1) may indicate a predicted affinity of the user 102 for the corresponding item, where the predicted affinity is determined by the classifier as described with reference to FIG. 6.

In some implementations, the graph data may include one or more criterion nodes 706 each corresponding to a criterion. If the user 102 has expressed an affinity for a criterion, the criterion node 706 corresponding to the criterion may be connected to the user node 702 by an edge 708(2). The presence of the edge 708(2) connecting the user node 702 to the criterion node 706 may indicate that the user 102 has expressed an affinity for the criterion. For example, the user 102 may have entered the criterion as a search criterion through the CUI 108, as described above. In some implementations, a criterion node 706 may be connected to one or more item nodes 704 if the corresponding items have been associated with the criterion. For example, a criterion node 706 may be connected by an edge 708 to an item node 704, and the value of the edge 708 may be the criterion score indicating the strength of association between the item and the criterion, e.g., determined through survey data or otherwise.

Determination of the content-based recommendation(s) may include traversing the graph according to the values of the various edges 708 connecting various nodes. For example, the search engine 122 may traverse the graph by following those edges 708 that have values indicating a predicted affinity of the user 102 for the item. The item(s) corresponding to the connected item node(s) 704 may be added to the determined set of recommendations. The search engine 122 may also traverse the graph along edges 708(2) connecting the user node 702 to criterion nodes 706 and then along edges connecting the criterion nodes 706 to item nodes 704. The item(s) corresponding to the connected item node(s) 704 may also be added to the determined set of recommendations.

Figure 8:
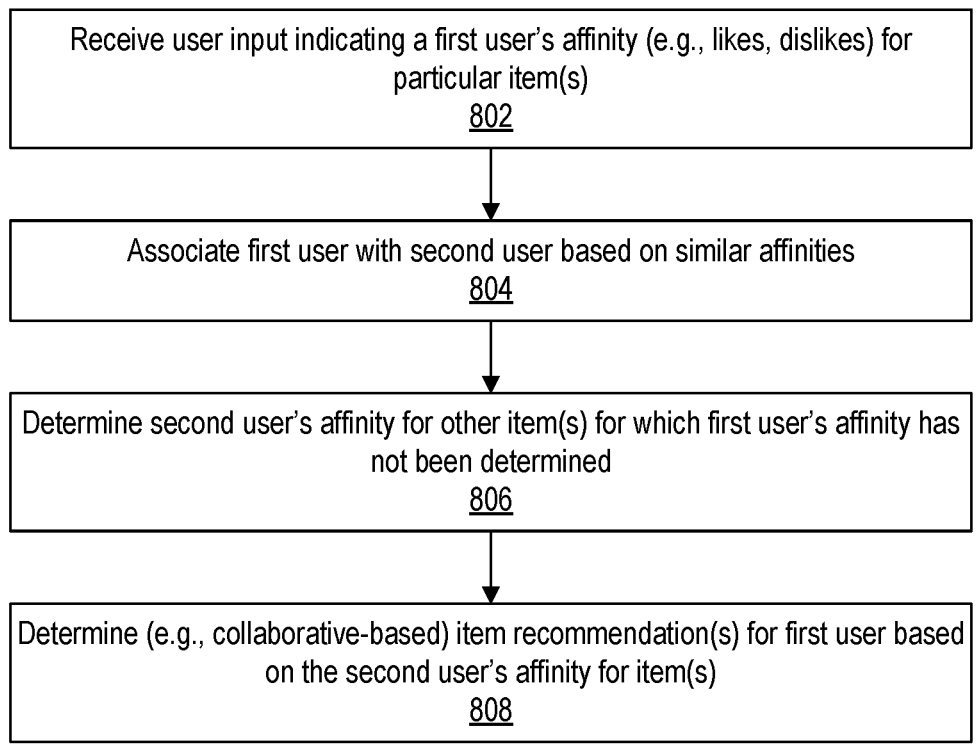
FIG. 8 depicts a flow diagram of an example process for determining item recommendations for a user, according to implementations of the present disclosure.

FIG. 8 depicts a flow diagram of an example process for determining (e.g., collaborative) item recommendations for a user 102, according to implementations of the present disclosure. Operations of the process may be performed by one or more of the search engine 122, or other software module(s) executing on the server device(s) 120 or elsewhere.

User input (e.g., uttered search term(s)) may be received (802) indicating the affinity of a first user 102 for one or more particular items, as described above. The first user 102 may be associated (804) with a second user 102 based at least partly on the second user 102 having expressed similar affinities as the first user 102. For example, the first and second users 102 may have both liked, or disliked, one or more particular items or types of items. The association may also be based on other similarities, such as similarities in location, purchase history, travel history, web browsing history, demographic characteristics, shared interests indicated on social networks or other public forums, and so forth.

The process may determine (806) the second user's affinity for other item(s) for which the first user's affinity has not been determined. For example, the second user 102 may have liked or disliked a set of items that the first user 102 is not aware of and has not expressed an affinity for. As another example, the classifier used in the content-based algorithm may predict that the second user 102 is likely to have a positive affinity for a set of items that the first user 102 is not aware of. A set of (e.g., collaborative) recommendations may be determined (808) for the first user 102 based on the other item(s) that have an affinity association with the second user 102. The recommendations may be provided for presentation to the first user 102 through the output device(s) 130. In some implementations, the recommendations may be a list that is ranked and/or ordered based on the predicted likelihood that the first user 102 will like the items. In some examples, the predicted likelihood that the first user 102 will like an item may be based on the strength of the association between the first and second users 102. The strength of that association may be based at least partly on the degree of similarity between the users' expressed affinities, the users' characteristics, and/or other considerations.

Figure 9:
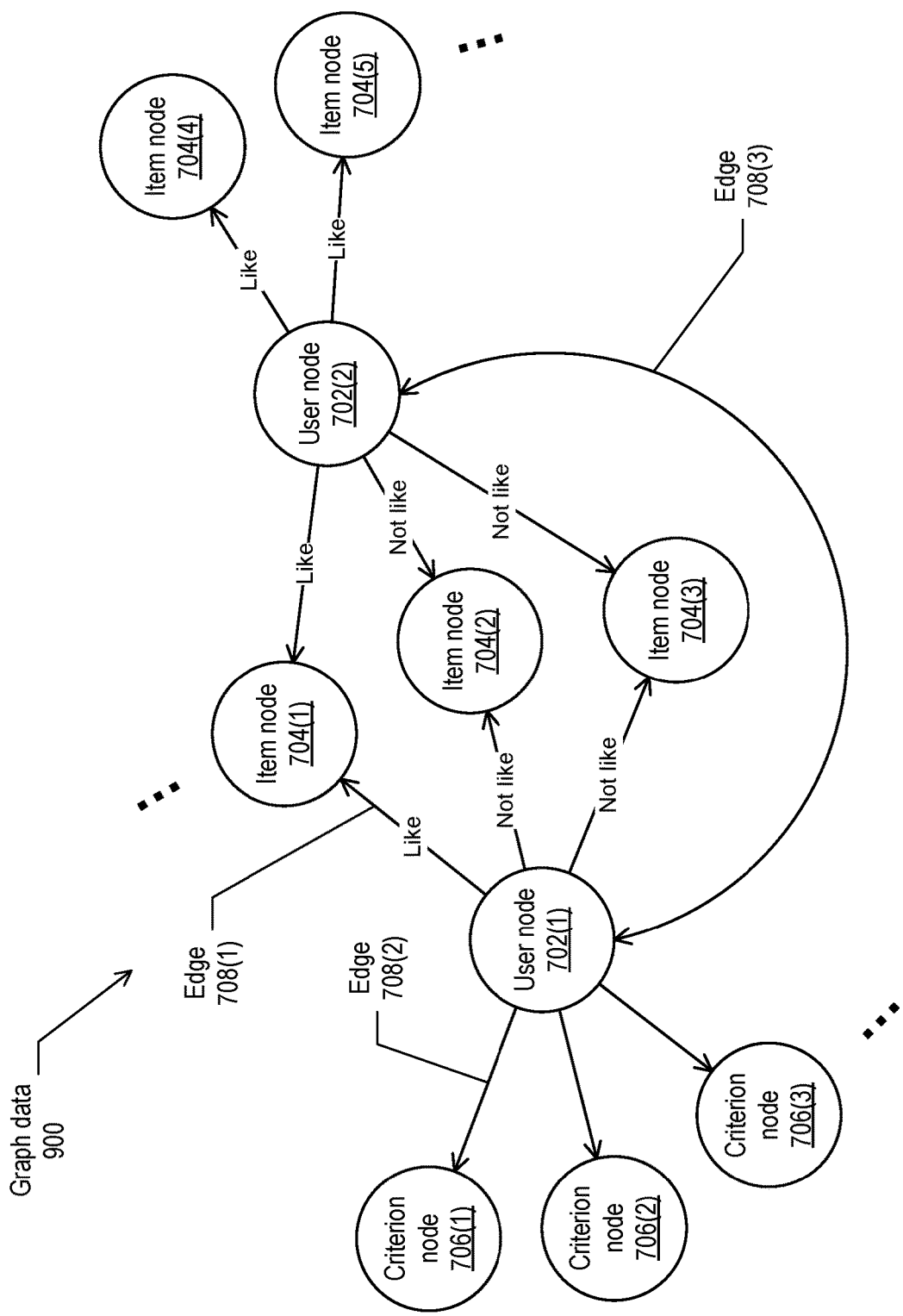
FIG. 9 depicts an example of graph data that may be employed to determine item recommendations for a user, according to implementations of the present disclosure.

FIG. 9 depicts an example of graph data 900 that may be employed to determine (e.g., collaborative) item recommendations for a user 102, according to implementations of the present disclosure. As shown in the example of FIG. 9, a first user 102 and a second user 102 may correspond respectively to a user node 702(1) and a user node 702(2). Based on similarities in affinity for items, and/or based on other similarities as described above, the user nodes 702 may be connected by an edge 708(3) that indicates the similarity-based association of the users 102. In the example of FIG. 9, the association between the user nodes 702(1) and 702(2) is based at least partly on the similarity of affinities between those user nodes 702 and the item nodes 704(1)-704(3). To determination recommendation(s) for the first user 102, the graph may be traversed to identify those item nodes 704(4), 704(5), and so forth for which the connecting edge 708 indicates a positive affinity between the second user 102 and the corresponding items. Those items may then be added to a set of recommendation(s) to be presented to the first user 102.

The information describing the various nodes and edges in the graph data may be stored in a database on the server device(s) 120 or elsewhere. The graph data may include nodes for users 102, items, and/or criteria. The graph data may also include any number of edges, where an edge indicates a connection between a pair of nodes. The edge may have a value that indicates a strength of association and/or a degree of affinity between two nodes as described above. The graph data may be modified as additional information is received regarding users 102, items, and/or criteria. For example, as a user 102 likes and/or dislikes items presented in the recommendation information 128, the graph data may be modified to include additional edges and/or nodes indicating the user's expressed affinities for the items. As a user 102 enters search criteria through the CUI 108, the graph data may be modified to include additional edges and/or nodes indicating the user's expressed affinities for the search criteria.

A user's affinity for items and/or criteria may be determined based on the user's various inputs, such as entered search criteria and/or indicated likes or dislikes of items as described above. The user's affinity for items and/or criteria may also be determined based on other information, including but not limited to one or more of the following: the user's browsing behavior online, the user's purchase history, the user's history test driving vehicles, information collected from social network posts or other published information, and so forth. In some examples, the strength of an affinity between the user 102 and an item or criterion (e.g., indicating by an edge value) may be determined based at least partly on the source data that led to the determination of the affinity. For example, if a user 102 test drives or buys a particular vehicle, an affinity may be determined between the user 102 and that vehicle. That affinity may be stronger (e.g., given a higher edge value) than an affinity determined based on the user 102 having browsed a web page that describes the vehicle or based on the user 102 having posted blog comment mentioning the vehicle. The context of the information may also be taken into account in determining the user's affinity for an item and/or criterion. For example, if the user 102 posts to a social network stating that they "hate vehicle X," a negative affinity between the user 102 and the vehicle may be determined. Whereas, if the user 102 posts to a social network stating that they "love vehicle X," a positive affinity may be determined. Moreover, the user's use of words like "hate" or "love" may lead to a determination of a strong negative or positive affinity, whereas words like "don't like" or "like" may lead to a determination of a weaker negative or positive affinity.

A user's affinity for items and/or criteria may be further determined based on the user's various inputs to the platform other than search term(s), such as inputs to the item history UI, the sale UI, and/or other interfaces exposed by the platform. In general, any information provided by the user 102 through any of the user experiences powered by the platform may be employed in further refining the classifier, the graph data, and/or other modeling tools used to determine connections between users, items, and/or criteria. In some implementations, the graph data may be stored in a database or other type of data storage that is indexed to facilitate search and/or other operations.

Figure 10:
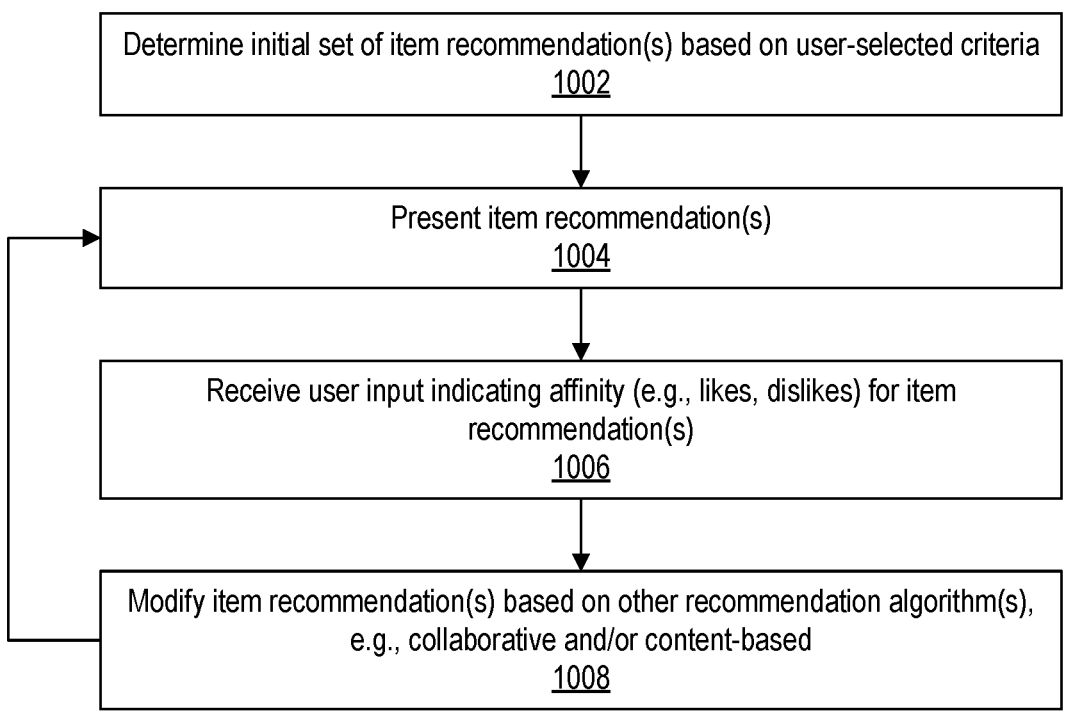
FIG. 10 depicts a flow diagram of an example process for determining item recommendations for a user, according to implementations of the present disclosure.

FIG. 10 depicts a flow diagram of an example process for determining item recommendations for a user 102, according to implementations of the present disclosure. Operations of the process may be performed by one or more of the search engine 122, or other software module(s) executing on the server device(s) 120 or elsewhere.

In some implementations, two or more of the criteria-based, content-based, and collaborative recommendation determination algorithms may be used in conjunction to determine recommendations for a user 102. For example, an initial set of item recommendations may be determined (1002) based on the user-selected criteria and the item profiles, as described above. The initial set of item recommendations may be provided for presentation (1004) to the user 102.

The user 102 may employ the CUI 108 to provide user input indicating their affinity (e.g., likes or dislikes) for the various items in the initial set of recommendations presented on the output device(s) 130, and that user input may be received (1006). Based on the user input, the item recommendations may be modified (1008) through operations of the content-based and/or collaborative algorithms as described above. The modified recommendations may be provided for presentation (1004) to the user 102, who may then provide further user input. In this way, implementations may provide any number of iterations of refining recommendations based on user input, using the various recommendation algorithms described herein. In some examples, the criteria-based algorithm may be described as seeding the recommendations with an initial analysis, which is then refined through use of the content-based and/or collaborative algorithms over any number of iterations.

The search engine 122 may be a learning engine which, over time, develops a better and/or more nuanced understanding of relationships between users, items, and/or criteria. For example, the search engine 122 may determine that a particular brand of vehicle is not suitable for towing. In such instances, the search engine 122 may decide not to include that brand of vehicle in its determined recommendations if the user 102 has indicated an affinity for the "towing" criterion.

Figure 11:
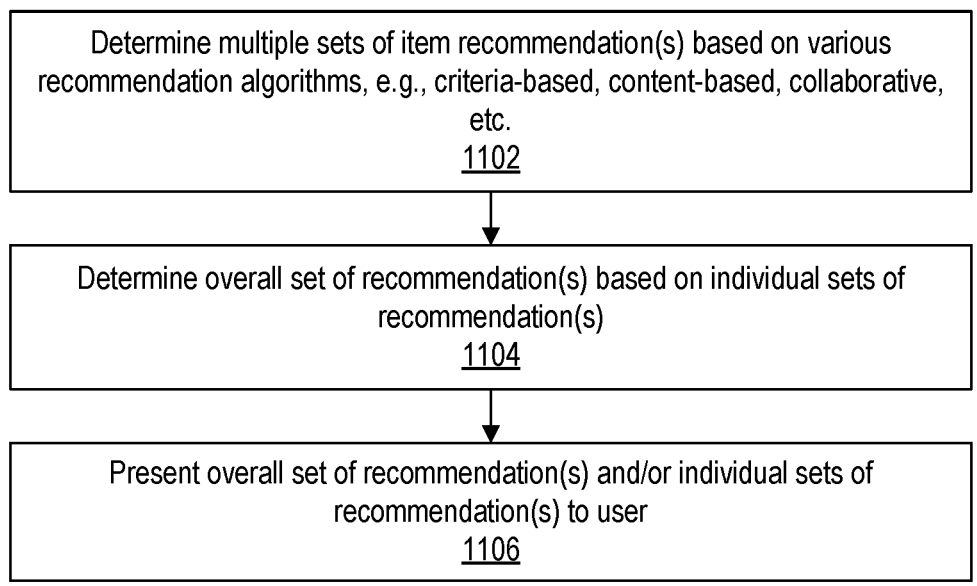
FIG. 11 depicts a flow diagram of an example process for determining item recommendations for a user, according to implementations of the present disclosure.

FIG. 11 depicts a flow diagram of an example process for determining item recommendations for a user 102, according to implementations of the present disclosure. Operations of the process may be performed by one or more of the search engine 122, or other software module(s) executing on the server device(s) 120 or elsewhere.

Multiple sets of recommendations may be determined (1102) based on the various recommendation determination algorithms, such as two or more of the criteria-based, content-based, or collaborative algorithms described herein. An overall set of recommendations is determined (1104) based on the individual sets of recommendations. The overall set of recommendations may be provided for presentation (1106) to the user 102 through the output device(s) 130. In some implementations, each of the individual sets of recommendations may be presented, e.g., side-by-side, to the user 102 in addition to, or instead of, the overall set of recommendations. In some implementations, the overall set of recommendations may be presented without presenting the individual sets of recommendations.

In the example of FIG. 11, the individual sets of recommendations determined through different algorithms are combined to determine an overall set of recommendations for the user 102. Implementations support various techniques for combining the individual sets of recommendations. For example, the individual sets of recommendations may be merged to determine the overall set of recommendations, with duplicate items collapsed into a single item in the overall list. In some implementations, the order of the overall list may be based on an average of the rank orders of the items in the individual lists. For example, if an item is ranked second, fourth, and sixth respectively in the three individual lists, it may be listed fourth in the overall list. In some implementations, the different individual lists may be weighted differently in determining the overall list. For example, the rank of an item in the content-based recommendations may weight more heavily than its rank in the collaborative recommendations.

In some implementations, the search engine 122 may perform one or more filtering operations to the determined recommendations prior to providing the recommendations for presentation to a user 102. For example, the search engine 122 may access user data describing the financial state (e.g., financial readiness) of the user 102, and filter out those items which may not be affordable to the user 102. Alternatively, the recommendation information 128 may be presented with an indication of which recommended item(s) fit with the user's financial situation, budget, financial plan, long-term goals, or other user data. In some implementations, the TCO of an item (e.g., vehicle) may be taken into account when filtering items. Other considerations may also be taken into account for filtering, such as safety considerations for vehicles. In some implementations, the filtering may be enabled and/or disabled by a user 102 through preferences that are set through the CUI 108 or through other interface(s).

Figure 12:
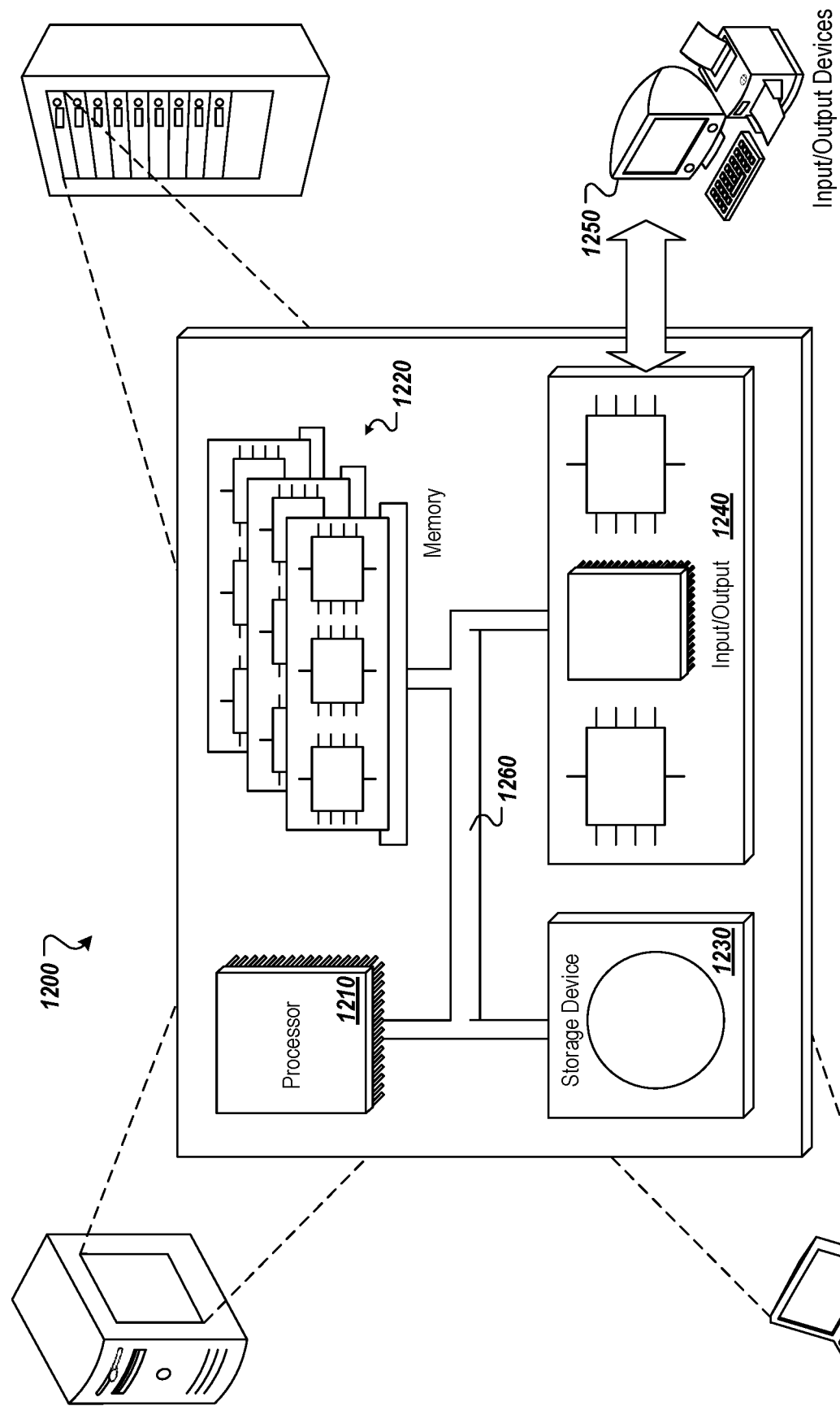
FIG. 12 depicts an example computing system, according to implementations of the present disclosure.

FIG. 12 depicts an example computing system, according to implementations of the present disclosure. The system 1200 may be used for any of the operations described with respect to the various implementations discussed herein. For example, the system 1200 may be included, at least in part, in one or more of the input device 104, the output device(s) 130, the server device(s) 120, and/or other computing device(s) or system(s) described herein. The system 1200 may include one or more processors 1210, a memory 1220, one or more storage devices 1230, and one or more input/output (I/O) devices 1250 controllable through one or more I/O interfaces 1240. The various components 1210, 1220, 1230, 1240, or 1250 may be interconnected through at least one system bus 1260, which may enable the transfer of data between the various modules and components of the system 1200.

The processor(s) 1210 may be configured to process instructions for execution within the system 1200. The processor(s) 1210 may include single-threaded processor(s), multi-threaded processor(s), or both. The processor(s) 1210 may be configured to process instructions stored in the memory 1220 or on the storage device(s) 1230. The processor(s) 1210 may include hardware-based processor(s) each including one or more cores. The processor(s) 1210 may include general purpose processor(s), special purpose processor(s), or both.

The memory 1220 may store information within the system 1200. In some implementations, the memory 1220 includes one or more computer-readable media. The memory 1220 may include any number of volatile memory units, any number of non-volatile memory units, or both volatile and non-volatile memory units. The memory 1220 may include read-only memory, random access memory, or both. In some examples, the memory 1220 may be employed as active or physical memory by one or more executing software modules.

The storage device(s) 1230 may be configured to provide (e.g., persistent) mass storage for the system 1200. In some implementations, the storage device(s) 1230 may include one or more computer-readable media. For example, the storage device(s) 1230 may include a floppy disk device, a hard disk device, an optical disk device, or a tape device. The storage device(s) 1230 may include read-only memory, random access memory, or both. The storage device(s) 1230 may include one or more of an internal hard drive, an external hard drive, or a removable drive.

One or both of the memory 1220 or the storage device(s) 1230 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 1200. In some implementations, the CRSM may include a data store that provides storage of computer-readable instructions or other information in a non-transitory format. The CRSM may be incorporated into the system 1200 or may be external with respect to the system 1200. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 1210 and the memory 1220 may be supplemented by, or incorporated into, one or more application-specific integrated circuits (ASICs).

The system 1200 may include one or more I/O devices 1250. The I/O device(s) 1250 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 1250 may also include one or more output devices such as a display, LED(s), an audio output device (e.g., a speaker), a printer, a haptic output device, and so forth. The I/O device(s) 1250 may be physically incorporated in one or more computing devices of the system 1200, or may be external with respect to one or more computing devices of the system 1200.

The system 1200 may include one or more I/O interfaces 1240 to enable components or modules of the system 1200 to control, interface with, or otherwise communicate with the I/O device(s) 1250. The I/O interface(s) 1240 may enable information to be transferred in or out of the system 1200, or between components of the system 1200, through serial communication, parallel communication, or other types of communication. For example, the I/O interface(s) 1240 may comply with a version of the RS-232 standard for serial ports, or with a version of the IEEE 1284 standard for parallel ports. As another example, the I/O interface(s) 1240 may be configured to provide a connection over Universal Serial Bus (USB) or Ethernet. In some examples, the I/O interface(s) 1240 may be configured to provide a serial connection that is compliant with a version of the IEEE 1394 standard.

The I/O interface(s) 1240 may also include one or more network interfaces that enable communications between computing devices in the system 1200, or between the system 1200 and other network-connected computing systems. The network interface(s) may include one or more network interface controllers (NICs) or other types of transceiver devices configured to send and receive communications over one or more networks using any network protocol.

Computing devices of the system 1200 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 1200 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:
   receiving, by the at least one processor, from an input computing device, speech data provided by a user during a speech interaction with a user interface (UI) executing on the input computing device;
   analyzing, by the at least one processor, the speech data to determine at least one search term that is specified by the user through the speech interaction;
   generating, by the at least one processor and based on the search term, at least one recommendation for the user including a search result responsive to the search term;
   automatically detecting at least one output computing device that is available to display the at least one recommendation, the at least one output computing device being different from the input computing device, wherein the detecting comprises:
   automatically detecting that the at least one output computing device is turned on and network-accessible;
   in response to automatically detecting that the at least one output computing device is turned on and network-accessible, prompting, through the UI executing on the input computing device, the user to confirm whether the at least one recommendation is to be presented on the at least one output computing device; and
   in response to receiving confirmation from the user that the at least one recommendation is to be presented on the at least one output computing device, transmitting, by the at least one processor, the at least one recommendation for display on the at least one output computing devices.

2. The method of claim 1, further comprising:
   transmitting, by the at least one processor, the at least one recommendation to the input computing device for presentation through the UI.

3. The method of claim 1, wherein the input computing device is a personal assistant (PA) device.

4. The method of claim 1, wherein:
   the input computing device is headless; and
   the at least one output computing device includes a display.

5. The method of claim 1, wherein the analyzed speech data is audio data that is recorded by at least one microphone that is a component of the input computing device.

6. The method of claim 1, wherein the analyzed speech data is text data that is generated by transcribing at least a portion of audio data that is recorded by at least one microphone that is a component of the input computing device.

7. The method of claim 1, wherein the at least one recommendation includes a plurality of recommended items that are ordered according to a respective item score for each of the plurality of recommended items.

8. The method of claim 1, wherein the output computing device is a television.

9. The method of claim 1, wherein detecting the at least one output computing device of the user that is available to display the at least one recommendation comprises:
   detecting a plurality of output computing devices that are located at different locations and are available to display the at least one recommendation, the plurality of output computing devices being different from the input computing device, and
   wherein transmitting, by the at least one processor, the at least one recommendation for display on the at least one output computing device comprises:
   transmitting, by the at least one processor, the at least one recommendation for display on the plurality of output computing devices.

10. A system, comprising:
    at least one processor; and
    a memory communicatively coupled to the at least one processor, the memory storing instructions which, when executed by the at least one processor, cause the at least one processor to perform operations comprising:
    receiving, from an input computing device, speech data provided by a user during a speech interaction with a user interface (UI) executing on the input computing device;
    analyzing the speech data to determine at least one search term that is specified by the user through the speech interaction;

generating at least one recommendation for the user including a search result responsive to the search term; and automatically detecting at least one output computing device of the user that is available to display the at least one recommendation, the at least one output computing device being different from the input computing device, wherein the detecting comprises:

automatically detecting that the at least one output computing device is turned on and network-accessible; and in response to automatically detecting that the at least one output computing device is turned on and network-accessible, prompting, through the UI executing on the input computing device, the user to confirm whether the at least one recommendation is to be presented on the at least one output computing device; and in response to receiving confirmation from the user that the at least one recommendation is to be presented on the at least one output computing device, transmitting, by the at least one processor, the at least one recommendation for display on the at least one output computing device.

11. The system of claim 10, the operations further comprising:

transmitting the at least one recommendation to the input computing device for presentation through the UI.

12. The system of claim 10, wherein the input computing device is a personal assistant (PA) device.

13. The system of claim 10, wherein:

the input computing device is headless; and the at least one output computing device includes a display.

14. The system of claim 10, wherein the analyzed speech data is audio data that is recorded by at least one microphone that is a component of the input computing device.

15. The system of claim 10, wherein the analyzed speech data is text data that is generated by transcribing at least a portion of audio data that is recorded by at least one microphone that is a component of the input computing device.

16. The system of claim 10, wherein the at least one recommendation includes a plurality of recommended items that are ordered according to a respective item score for each of the plurality of recommended items.

17. One or more non-transitory computer-readable media storing instructions which, when executed by at least one processor, cause the at least one processor to perform operations comprising:

receiving, from an input computing device, speech data provided by a user during a speech interaction with a user interface (UI) executing on the input computing device;

analyzing the speech data to determine at least one search term that is specified by the user through the speech interaction;

determining an item score for each of a plurality of items, wherein the item score indicates a predicted affinity of the user for a respective item and is determined based at least partly on a degree of correspondence between the at least one search term and criteria information for the respective item;

generating at least one recommendation for the user including a search result responsive to the search term; and automatically detecting at least one output computing device of the user that is available to display the at least one recommendation, the at least one output computing device being different from the input computing device, wherein the detecting comprises:

automatically detecting that the at least one output computing device is turned on and network-accessible; and in response to automatically detecting that the at least one output computing device is turned on and network-accessible, prompting, through the UI executing on the input computing device, the user to confirm whether the at least one recommendation is to be presented on the at least one output computing device; and in response to receiving confirmation from the user that the at least one recommendation is to be presented on the at least one output computing device, transmitting, by the at least one processor, the at least one recommendation for display on the at least one output computing devices.

18. The one or more non-transitory computer-readable media of claim 17, wherein:

the input computing device is headless; and the at least one output computing device includes a display.

19. The one or more non-transitory computer-readable media of claim 17, wherein the analyzed speech data is audio data that is recorded by at least one microphone that is a component of the input computing device.

20. The one or more non-transitory computer-readable media of claim 17, wherein the analyzed speech data is text data that is generated by transcribing at least a portion of audio data that is recorded by at least one microphone that is a component of the input computing device.

* * * * *